United States Patent
Pu et al.

(10) Patent No.: US 8,115,545 B2
(45) Date of Patent: Feb. 14, 2012

(54) AUTOMATIC LEVEL CONTROL

(75) Inventors: Chiang Pu, San Jose, CA (US);
Ming-Chieh Huang, San Jose, CA (US);
Chan-Hong Chern, Palo Alto, CA (US);
Tien-Chun Yang, San Jose, CA (US)

(73) Assignee: Taiwan Semiconductor Manufacturing Company, Ltd.

( * ) Notice: Subject to any disclaimer, the term of this patent is extended or adjusted under 35 U.S.C. 154(b) by 0 days.

(21) Appl. No.: 13/177,958

(22) Filed: Jul. 7, 2011

(65) Prior Publication Data

US 2011/0267139 A1 Nov. 3, 2011

Related U.S. Application Data

(62) Division of application No. 12/704,719, filed on Feb. 12, 2010, now Pat. No. 8,004,354.

(51) Int. Cl.
*H03F 1/36* (2006.01)
(52) U.S. Cl. .......................... 330/86; 330/260
(58) Field of Classification Search .............. 330/69, 330/86, 260
See application file for complete search history.

(56) References Cited

U.S. PATENT DOCUMENTS

| | | | |
|---|---|---|---|
| 4,070,632 A | 1/1978 | Tuttle | |
| 5,638,029 A * | 6/1997 | O'Shaughnessy | 331/44 |
| 5,952,883 A * | 9/1999 | Masuta | 330/279 |
| 6,392,859 B1 * | 5/2002 | Ohshima | 361/100 |
| 6,867,647 B2 * | 3/2005 | Wouters | 330/69 |
| 7,109,693 B2 * | 9/2006 | Yoshida et al. | 323/282 |
| 7,177,130 B2 * | 2/2007 | Ohshima | 361/93.9 |
| 7,205,845 B2 | 4/2007 | Harms et al. | |
| 7,245,179 B2 | 7/2007 | Chang | |
| 7,352,242 B1 | 4/2008 | Hughes | |
| 7,560,959 B2 * | 7/2009 | Paraschou et al. | 327/72 |

OTHER PUBLICATIONS

Sharma, Ajit, "CMOS Systems and Circuits for Sub-Degree Per Hour MEMS Gyroscopes", A Thesis Presented to the Academic Faculty by Ajit Sharma, In Partial Fulfillment of the Requirements for the Degree of Doctor of Philosophy in the School of Electrical and Computer Engineering, Georgia Institute of Technology, Dec. 2007, 181 pages.

* cited by examiner

*Primary Examiner* — Henry Choe
(74) *Attorney, Agent, or Firm* — Lowe Hauptman Ham & Berner, LLP

(57) ABSTRACT

Some embodiments regard a circuit comprising: a high voltage transistor providing a resistance; an amplifier configured to receive a current and to convert the current to a first voltage that is used in a loop creating the current; and an automatic level control circuit that, based on an AC amplitude of the first voltage, adjusts a second voltage at a gate of the high voltage transistor and thereby adjusts the resistance and the first voltage; wherein the automatic level control circuit is configured to adjust the first voltage toward the first reference voltage if the first voltage differs from a first reference voltage.

20 Claims, 9 Drawing Sheets

AUTOMATIC LEVEL CONTROL

CROSS-REFERENCE TO RELATED APPLICATIONS

The present application is a Divisional of and claims the priority of U.S. application Ser. No. 12/704,719, filed on Feb. 12, 2010, which is incorporated herein by reference in its entirety.

TECHNICAL FIELD

The present disclosure is generally related to automatic level control. In various embodiments, an automatic level control circuit is used in a microelectromechanical systems or structures (MEMS) gyroscope drive loop to cover a wide current range of the gyroscope.

BACKGROUND

In a MEMS gyroscope drive loop, an electrical current (e.g., current Igyro) is generally created from mechanical displacement of the gyroscope and converted to electrical voltage for a phase-lock loop (PLL) input signal. This current Igyro, however, can have a wide range covering many orders of magnitude. For example, in an approach, the range expands four orders of magnitude, such as from 0.2 nA to 2 μA. To convert this wide current range to a reasonable voltage level, a corresponding wide range of variable resistance (e.g., a resistor Rimp) is used so that the large resistance value at the upper range can correspond to the low current value amplification. Because of the large resistance requirement and thus large die area, resistor Rimp is typically implemented "off-chip," i.e., outside of the die/semiconductor chip embodying the MEMS structure, and on a board level. Further, resistor Rimp is generally required to be adjustable to maintain sufficient electrical voltage level for various currents Igyro to lock the PLL, to limit the voltage level, and to prevent the device from being overstressed. Adjusting resistor Rimp for appropriate amplification is commonly done manually by human beings, which is not suitable for mass production.

In another approach, to achieve automatic control, an automatic level control (e.g., ALC) unit is designed utilizing an NFET with proper control at the gate to provide resistance in place of the gyro resistor Rimp. The unit, however, uses two stage of amplification to cover the four orders of magnitude difference of the Igyro. The unit also uses sophisticated circuitry with amplifiers and diodes, all of which is prone to errors and large power consumption in the μA range, making the unit inefficient.

BRIEF DESCRIPTION OF THE DRAWINGS

The details of one or more embodiments of the invention are set forth in the accompanying drawings and the description below. Other features and advantages of the invention will be apparent from the description, drawings, and claims.

Like reference symbols in the various drawings indicate like elements.

DETAILED DESCRIPTION

Figure 1:
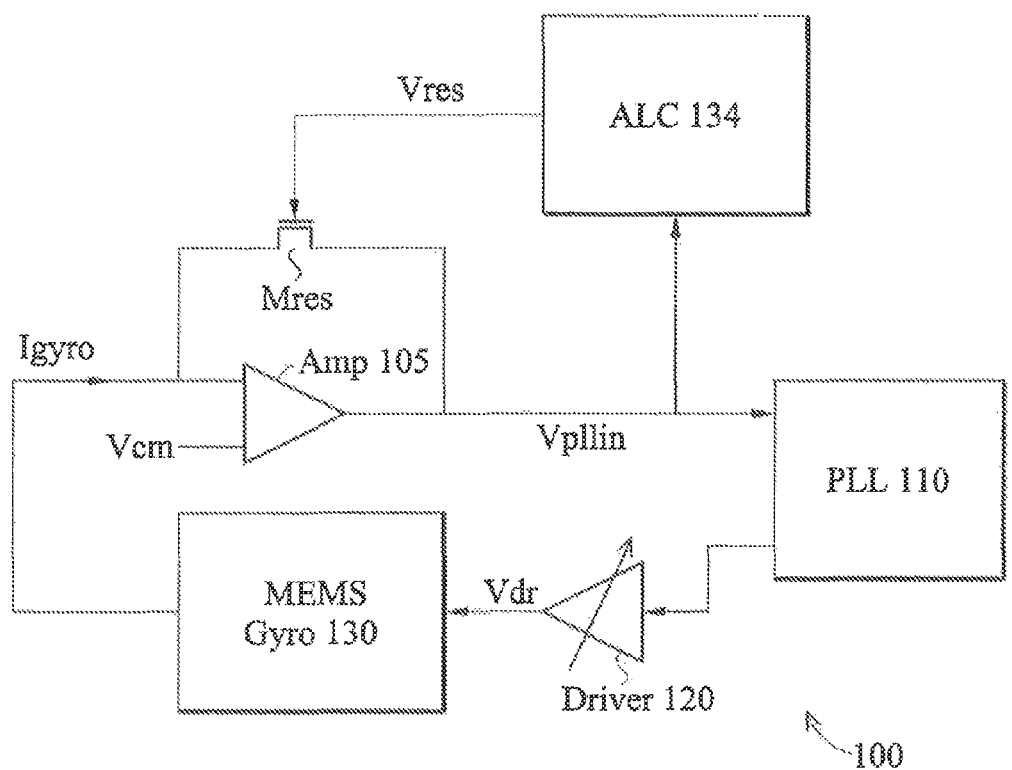
FIG. 1 shows an exemplary circuit upon which embodiment of the invention may be implemented.

Embodiments, or examples, of the invention illustrated in the drawings are now being described using specific language. It will nevertheless be understood that no limitation of the scope of the invention is thereby intended. Any alterations and modifications in the described embodiments, and any further applications of principles of the invention described in this document are contemplated as would normally occur to one skilled in the art to which the invention relates. Reference numbers may be repeated throughout the embodiments, but this does not necessarily require that feature(s) of one embodiment apply to another embodiment, even if they share the same reference number.

Exemplary Application

Gyroscope Drive Loop

FIG. 1 shows a circuit 100 upon which embodiments of the invention may be implemented.

High voltage NMOS transistor (HV NMOS transistor) Mres provides a large resistance (e.g., resistance Res, not shown) when the voltage at its gate (e.g., voltage Vres) is properly adjusted. Generally, because of the inverse relationship between the gate voltage Vres of transistor Mres and its resistance Res, some embodiments of the invention increase voltage Vres to decrease resistance Res and decrease voltage Vres to increase resistance Res. Further, as transistor Mres can provide a wide resistance range, amplifier 105 can appropriately amplify current Igyro and convert it to voltage Vpllin. As a result, embodiments of the invention do not require more than one amplification stage (e.g., two amplification stages like another approach). Further, because transistor Mres does not take much die space as compared to a resistor, transistor Mres can be implemented "on-chip," e.g., on the same die/semiconductor chip embodying circuit 100. Depending on applications, an HV NMOS transistor (e.g., HV NMOS transistor Mres) is generated based on special doping as compared to a standard NMOS counterpart. In an embodiment, HV NMOS transistor Mres is configured to have an operation voltage (e.g., voltage Vdd) at about 1.8V to about 30V while voltage Vdd for other circuitry in circuit 100 remains at about 1.8V. Using an HV NMOS transistor (versus a standard NMOS transistor) is advantageous over other approach because the HV NMOS can provide a wider range of resistance than that of the standard NMOS transistor.

Generally, when MEMS gyro 130 is moved and/or rotated, current Igyro is created and includes an alternating current (AC) component. In various embodiments current Igyro oscillates in the range of 15 KHz, and embodiments of the invention can respond to a wide range of this current Igyro, which could expand from 0.2 nA to 2 μA in amplitude. For example, embodiments of the invention can detect the lower end of current Igyro at 0.2 nA, but are not subject to saturating or overstressing the circuit when current Igyro reaches its high end of 2 μA.

Amplifier 105 amplifies the I-to-V conversion, e.g., converting current Igyro to voltage Vpllin, which comprises a direct current (DC) voltage (e.g., from the common mode voltage) plus some AC amplitude. If current Igyro does not include an AC component, voltage Vpllin functions in the DC level of the common mode voltage. Typically voltage Vpllin oscillates at the same frequency as current Igyro, which, in various embodiments, is at about 15 KHz. Voltage Vpllin also serves as an input to phase-lock loop 110 and to automatic level control (ALC) circuit 134. Generally, the amplitude of voltage Vpllin results from Igyro*Res, or, in another word, voltage Vpllin equals the common mode voltage of amplifier 105 (e.g., Vcm) plus some AC component resulting from the AC component of current Igyro. Embodiments of the invention detect this AC component, or in fact, the amplitude of voltage Vpllin. For example, if Vcm=1.5 Volts (V), the amplitude of Vpllin is 1 V, and α is the amplifying factor, then Vpllin=1.5±1*(α). In a particular embodiment, because amplifier 105 functions as a source follower, α is less than ("<") 1. If voltage Vpllin including its common mode and the amplitude is higher than the threshold of transistor M1 (FIG. 2), voltage Vpllin turns on this transistor M1, and turns it off otherwise. As will be explained in details below, if voltage Vpllin is undesirably high, embodiments of the invention pull it down, and if it is undesirably low, embodiments pull it up. Typically, the low of voltage Vpllin, when appropriate, should be high enough to be recognized by the circuitry environment in which voltage Vpllin operates, and the high of voltage Vpllin should not be too high with reference to voltage Vdd (the voltage supply operation of the circuitry) that can damage related circuitry. Depending on applications, various embodiments of the invention may be used in the CMOS environment. In an embodiment, voltage Vpllin is used to drive the next stage including an inverter, and the low of voltage Vpllin is configured to be high enough to toggle that inverter, and the high of voltage Vpllin is configured to be around Vdd or lower to not stress the circuitry.

Voltage Vcm provides a bias point for amplifier 105. Based on the relationship between Igyro, resistance Res, and voltage Vpllin, ALC 134 controls resistance Res and thus controls the amplification of amplifier 105 or the amplitude of voltage Vpllin.

Phase-lock loop (PLL) 110 locks in the clock or frequency of voltage Vpllin. Driver 120 provides voltage Vdr to control MEMS gyro 130. Generally, the higher the voltage Vdr, the higher oscillation results from MEMS gyro 130 and the higher current Igyro is created.

Automatic level control (ALC) 134 takes voltage Vpllin as an input, provides a corresponding voltage (e.g., voltage Vamp, FIG. 2), and, based on the proportionality of the AC amplitude of voltage Vpllin and voltage Vamp with reference to a threshold voltage, adjusts voltage Vres to adjust resistor Res in a desired direction. For example, if Igyro*Res is larger than a certain threshold that can affect performance of other circuitry, ALC 134 increases voltage Vres to decrease Rres and thus decrease Igyro*Res. In effect, embodiments of the invention control amplification of amplifier 105 by controlling voltage Vres, thereby control resistance Res and voltage Vpllin.

Automatic Level Control

Exemplary Embodiment

Figure 2:
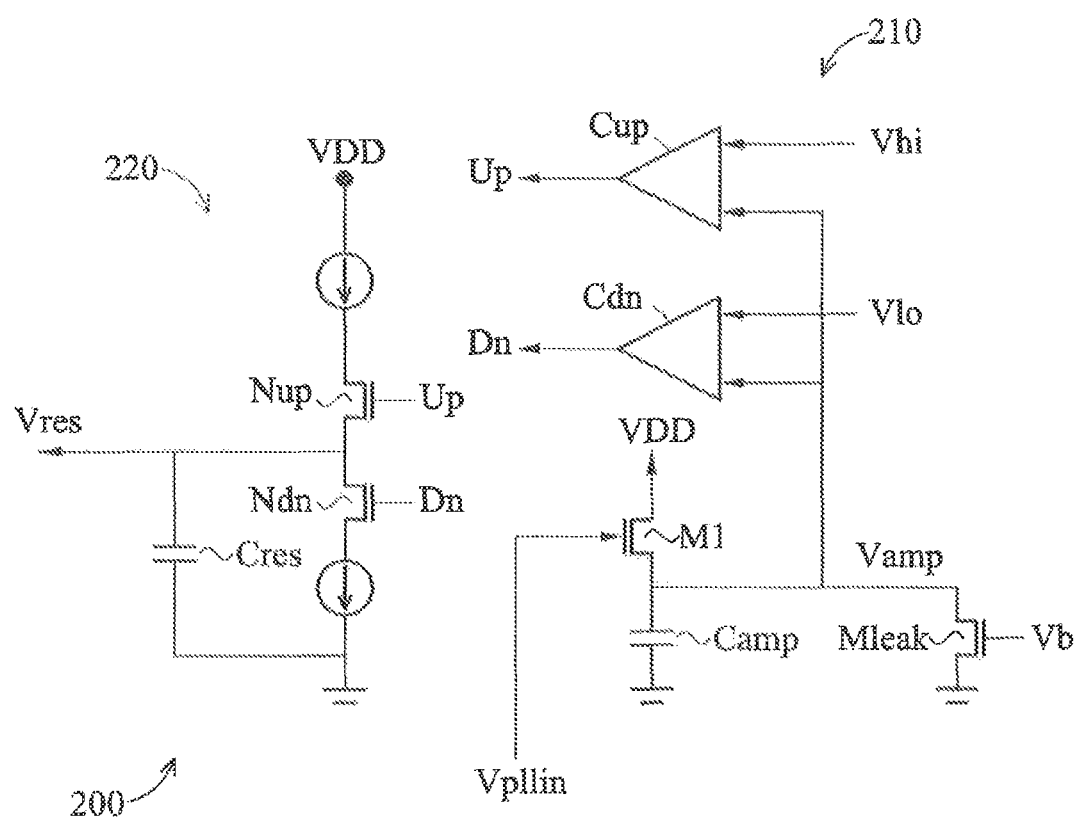
FIG. 2 shows an embodiment of the automatic level control of the circuit in FIG. 1.

FIG. 2 shows an automatic level control (ALC) 200 illustrating an embodiment of ALC 134. ALC 200 may be considered as having an amplitude detector 210 and a level control 220, but embodiments of the invention are not limited to such a characterization, but are applicable to various implementations of ALC 134 consistent with the disclosure in this document.

Transistor M1 functions like a switch to toggle voltage Vamp based on the amplitude of voltage Vpllin. In operation, when there is no AC amplitude transistor M1 settles in the DC operation point. In various embodiments of the invention, transistor M1 is biased in the DC bias point, and the AC amplitude of voltage Vpllin turns on/off transistor M1. That is when Vcm (the common mode voltage) of amplifier 105 or the DC level of voltage Vpllin plus its amplitude is higher than the threshold of transistor M1, transistor M1 is turned on causing a charge at capacitor Camp. When Vcm minus its amplitude is smaller than the threshold of transistor M1, transistor M1 is off and there is no charge for capacitor Camp.

Capacitor Camp stores charges for voltage Vamp. That is, when transistor M1 is on, voltage Vamp charges this capacitor Camp; and if transistor M1 is off, there is no charge.

Voltage Vamp is proportional to voltage Vpllin. Mathematically, Vamp=Vpllin−Vthm1 (the threshold voltage of transistor M1).

Programmable voltages Vhi and Vlo serve as the reference voltages for comparators Cup and Cdn. When appropriate, if voltage Vamp is lower than voltage Vlo, ALC 200 causes voltage Vamp to increase to voltage Vlo. Similarly, when Vamp is higher than Vhi, ALC 200 causes voltage Vamp to decrease to voltage Vhi. In effect, voltage Vlo and Vhi together control voltage Vamp in a range higher than voltage Vlo and lower than voltage Vhi. Depending on applications (e.g., if no range is desired), voltage Vlo may be equal to voltage Vhi. Alternatively expressing, voltage Vlo and Vhi may be set in a range for voltage Vamp to fit in. In various embodiments, circuit 100 (and thus 200) operates in the CMOS level (e.g., 0V to Vdd at 1.8V), voltage Vlo and Vhi may be set at about 1.5V and 1.8V (or even 2.0V, depending on situations) respectively. The 1.5V lower limit is sufficient for the CMOS low level operation while the 1.8V higher limit sets the limit to not overstress relevant circuitry.

Based on the proportionality between voltages Vamp and Vpllin as compared to voltages Vhi and Ylo, amplitude detector 210 creates appropriate signals (e.g., signals Up and Dn) to have voltage Vres and resistance Res adjusted accordingly. Amplitude detector 210 provides mechanisms to maintain a desirable amplitude of voltage Vamp. For example, if this amplitude of voltage Vamp is lower than desirable, amplitude detector 210 activates signal Dn to increase resistance Res, which, going through a loop, causes this amplitude of voltage Vamp to increase. In contrast, if this amplitude is higher than desirable, amplitude detector 210 activates signal Up to decrease resistance Res, which, via the same loop, causes this amplitude to decrease. Embodiments of the invention set (e.g., predefine) voltages Vhi and Vlo based on the desired amplitude of voltage Vpllin and/or voltage Vamp.

In effect, voltages Vhi and Vlo, via comparators Cup and Cdn, control (e.g., charge or discharge) voltage Vres based on the amplitude of voltage Vamp with respect to voltages Vhi and Ylo. If voltage Vamp is low, e.g., lower than voltage Vlo, comparator Cdn activates signal Dn, e.g., causing it to be high, while comparator Cup deactivates signal Up, e.g., causing it to be low. An activated signal Dn activates transistor Ndn and a de-activated signal Up de-activates transistor Nup, which causes capacitor Cres to be discharged, or voltage Vres to decrease. As voltage Vres decreases, resistance Res increases causing voltage Vpllin to increase because current Igyro remains the same. Voltage Vpllin increases causing voltage Vamp to increase until voltage Vamp=Vlo.

If voltage Vamp is large, e.g., higher than voltage Vhi, comparator Cup activates signal Up, e.g., causing it to be high, while comparator Cdn de-activates signal Dn, e.g., causing it to be low. An activated signal Up activates transistor Nup and a de-activated signal Dn de-activates transistor Ndn, which causes capacitor Cres to be charged up to voltage Vdd through transistor Up, which causes voltage Vres to increase. As voltage Vres increases, resistance Res decreases causing voltage Vpllin to decrease because current Igyro remains the same. Voltage Vpllin decreases causing voltage Vamp to decrease until Vamp=Vhi. In the above illustration, when transistor Nd is on, transistor Nup is off and vice versa. Further, capacitor Cres, transistors Nup and Ndn all together function as a charge pump.

Transistor Mleak provides a large resistance to compensate for current leakage of transistor M1 and thus protect related circuitry. For example, based on the amplitude of voltage Vpllin and thus of voltage Vamp, the leakage of transistor M1 can bring voltage Vamp up to voltage Vdd and thus damage related circuitry. In an embodiment, transistor Mleak is biased in the sub-threshold region (or weak-inversion region) where the gate-to-source voltage is below its threshold voltage. In an embodiment, voltage Vb that biases transistor Mleak is set to about the threshold voltage of transistor Mleak. Since transistor Mleak is in the sub-threshold region, its leakage, if arises, is small. This leakage also corresponds to the leakage of transistor M1. In effect, adding transistor Mleak prevents current from the drain to the source of transistor M1 from reaching to a large but undesirable value, and voltage Vamp from being charged up to Vdd. Any current leakage from transistor M1 would leak through transistor Mleak. As a result, voltage Vamp remains in the desired amplitude proportional to voltage Vpllin. In an embodiment transistor Mleak is also an HV NMOS transistor for a wider range of resistance. In some embodiments, the sizes of transistor M1 and Mleak are about one to one for the corresponding leakage compensation.

Amplitude detector 210 is distinguished from a peak detector used in other approaches because amplitude detector 220 is much simpler without complicated circuitry such as amplifiers, diodes, etc., in those approaches. Using an amplitude detector 135 (versus a peak detector), embodiments of the invention do not require an exact measurement for voltage Vamp, but can rely on the proportionality between the amplitude of voltage Vamp and of voltage Vpllin. In an embodiment, amplitude detector 210 consumes less than 100 nA during detection, and is advantageous over other approaches that use amplifiers and complicated circuit and that consume power in the μA range.

FIGS. 3, 4, 5, and 6 show waveforms 300, 400, 500, and 600 illustrating the relationship between current Igyro and various voltages of circuit 100, in accordance with an embodiment, Waveform 300 shows that the amplitude of current Igyro varies from a small value of 0.2 nA to a large value of 2 μA from time t1 (e.g., at 0 S) to time t2 (e.g., at about 1.0 S). Waveforms 400, 500, and 600 show voltage Vpllin, voltage Vres, and voltage Vamp corresponding to current Igyro during the same time t1 to t2. Waveforms 300 and 400 are sinusoidal, but for amplitude illustration, the sinusoidal details are not shown.

Figure 3:
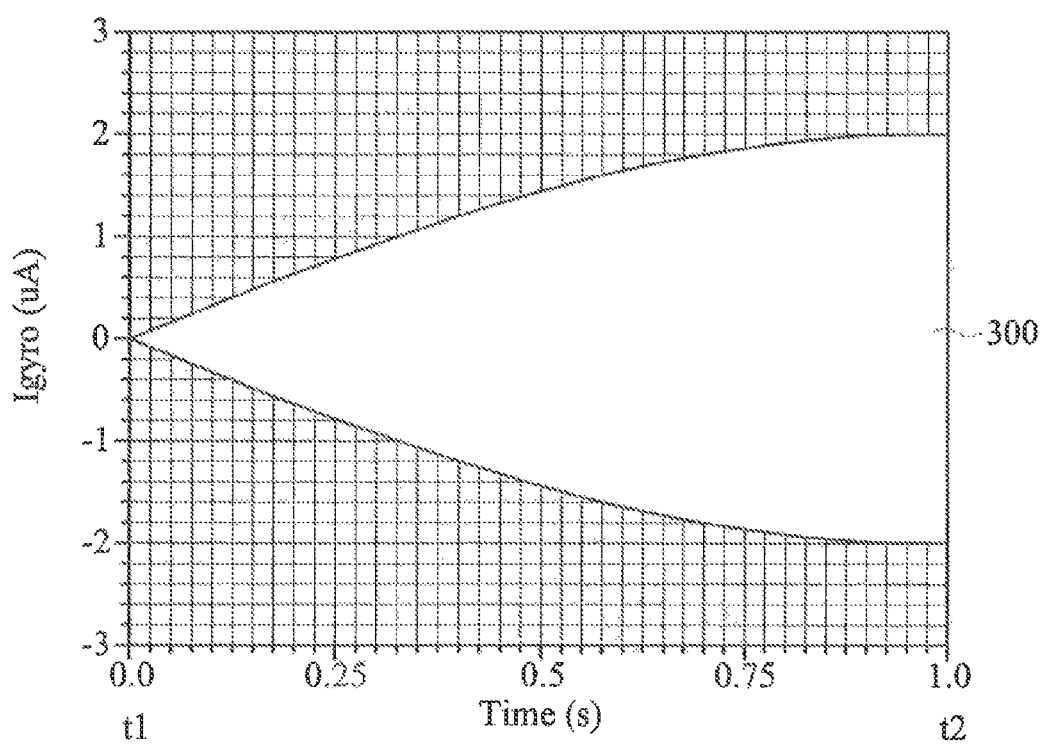
FIGS. 3-9 show the relationship between various currents and voltages in accordance with the illustrative embodiment of FIG. 1.
Figure 4:
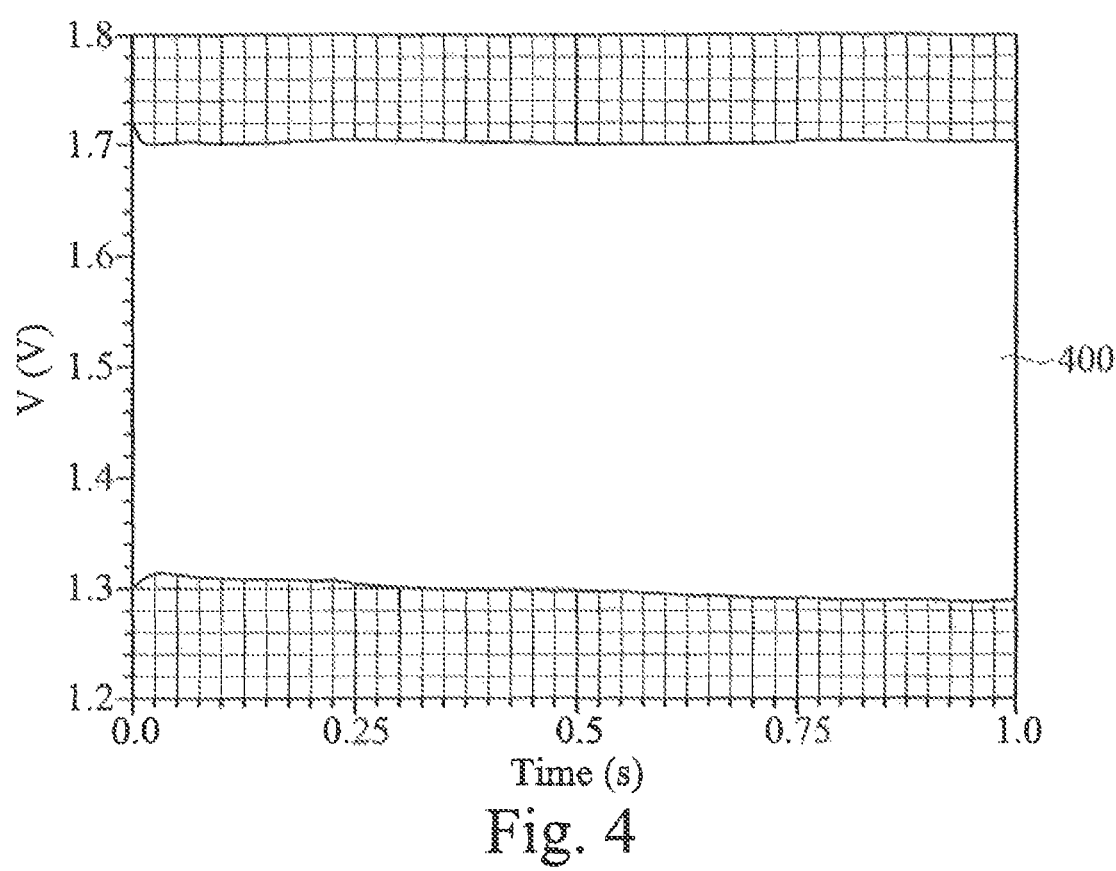
Figure 5:
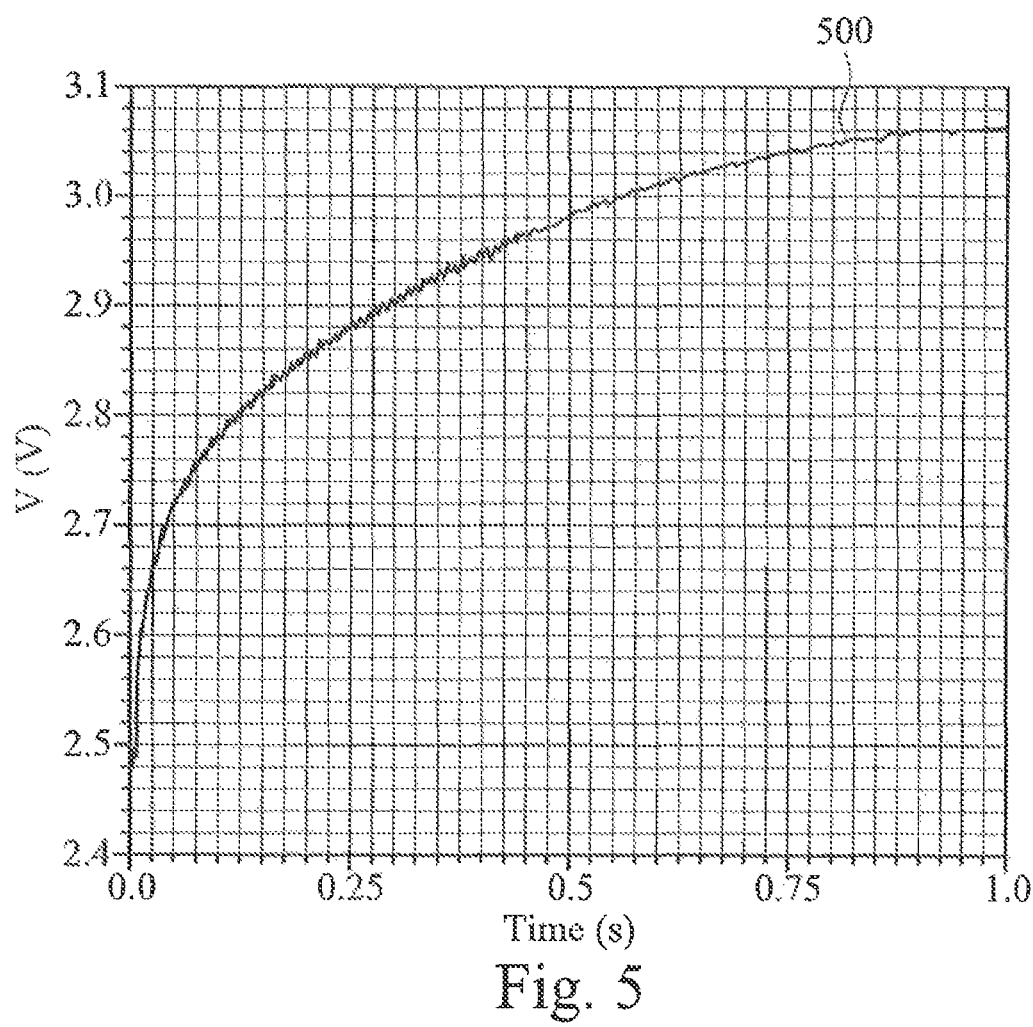
Figure 6:
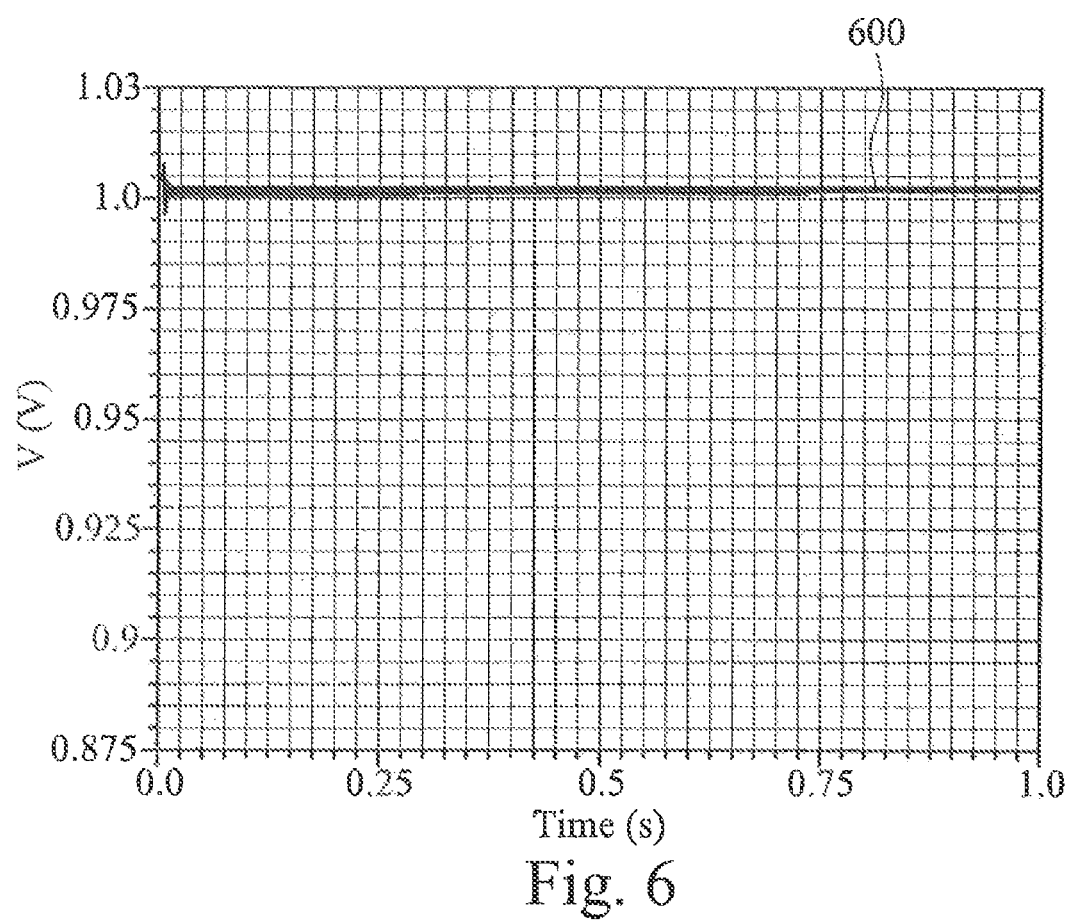

During time t1 to t2 when the amplitude of current Igyro in FIG. 3 changes from 0.2 nA to 2 μA, voltage Vpllin in FIG. 4 remains a steady level between 1.7 and 1.3 V, which is an amplitude of plus and minus 200 mv around the common voltage of 1.5 V. At the same time, voltage Vres in FIG. 5 changes from about 2.5 V to about 3.05 V. These waveforms 300, 400, and 500 illustrate that embodiments of the invention automatically adjust resistance Res as current Igyro continuously changes from 0.2 nA to 2 μA. This is because Vpllin (its amplitude)=Igyro*Res, and Igyro increases but voltage Vpllin (almost) remains the same, resistance Res must be decreasing, which corresponds to the increase of voltage Vres from about 2.V to 3.05V. Waveform 600 shows voltage Vamp remains constant at about 1.0V, which is consistent with the fact as explained above that voltage Vamp is proportional to voltage Vpllin.

Figure 7:
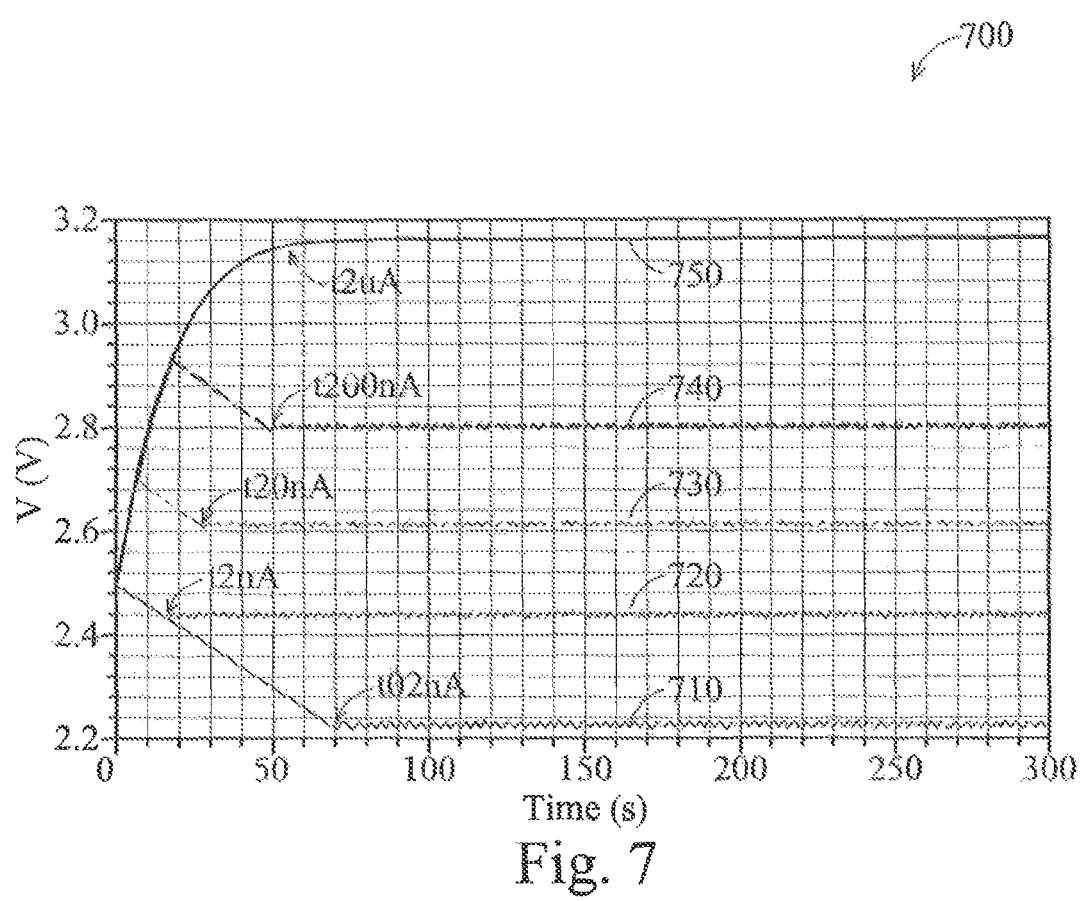

FIG. 7 shows waveforms 700 illustrating the relationship between voltage Vres and current Igyro during a period of about 300 mS, in accordance with an embodiment. Waveforms 710, 720, 730, 740, and 750 correspond to voltages Vres that corresponds to current Igyro at 0.2 nA, 2 nA, 20 nA, 200 nA, and 2 μA, respectively. Waveforms 700 show that, after some settling time t02 nA, t2 nA, t20 nA, t200 nA, and t2 μA, voltage Vres stays constant, but the constant level is proportional to current Igyro. For example, the levels of voltage Vres are at about 2.24 V, 2.44 V, 2.61 V, 2.8 V and 3.16 V corresponding to current 0.2 nA, 2 nA, 20 nA, 200 nA, and 2 μA, respectively. As a result, based on these waveforms, a desired level of voltage Vres may be selected based on a corresponding value of current Igyro. For example, some embodiments can set current Igyro at 0.2 nA, 2 nA, 20 nA, 200 nA, and 2 μA, etc., to get a desired amplitude of 2.24 V, 2.44 V, 2.61 V, 2.8 V and 3.16 V, etc., respectively.

Figure 8:
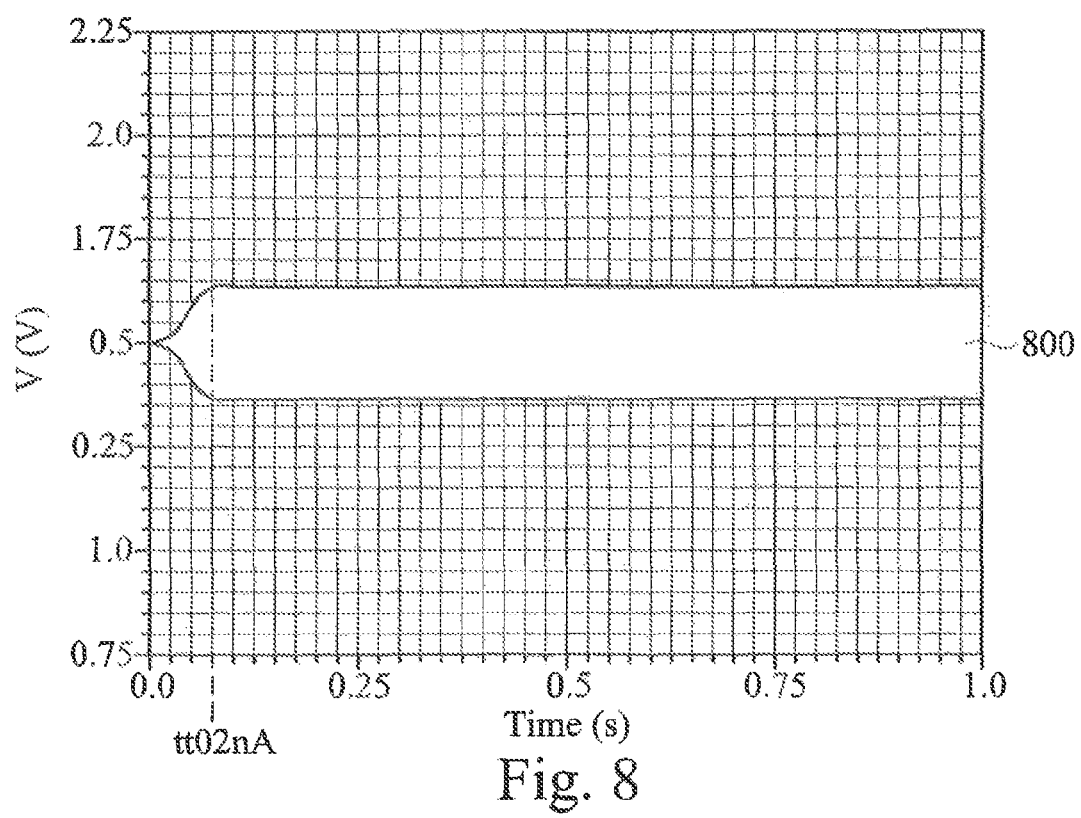
Figure 9:
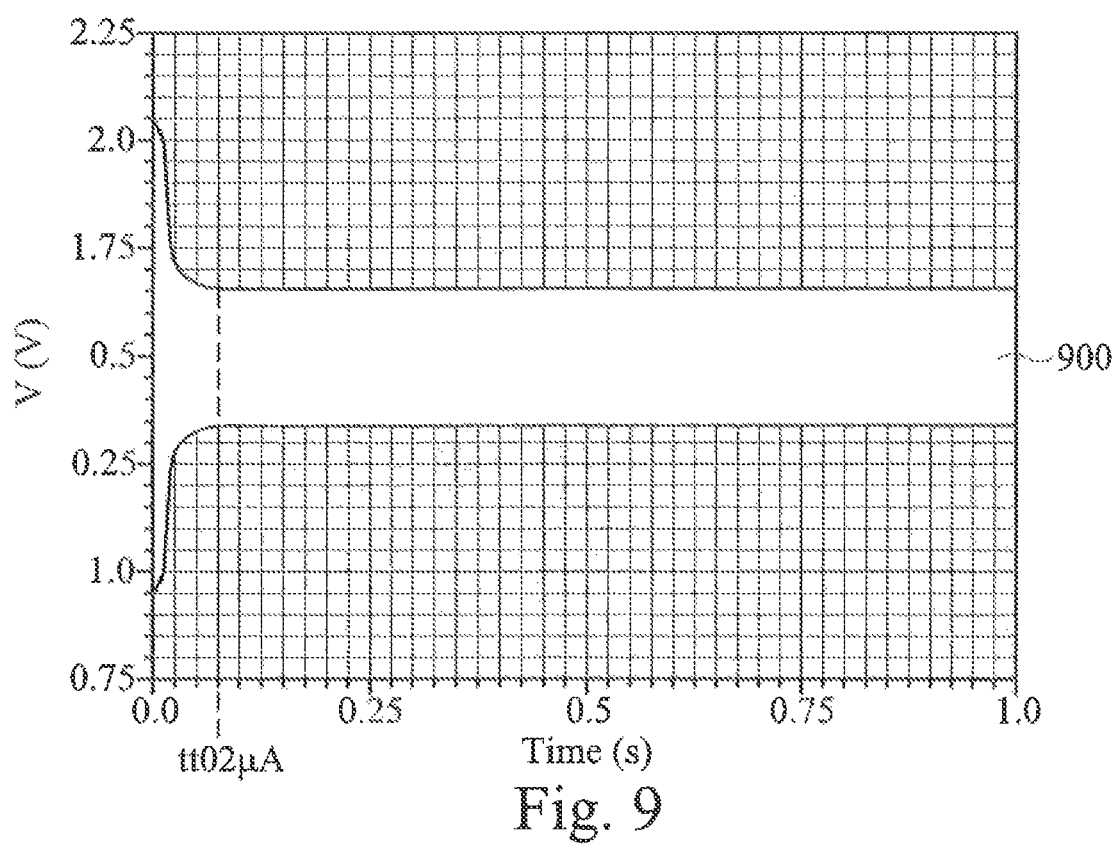

FIGS. 8 and 9 show waveforms 800 and 900 illustrating the relationship between voltage Vpllin and current Igyro at 0.2 nA and 2 μA respectively. Waveforms 800 and 900 are sinusoidal, but for amplitude illustration, the sinusoidal details are not shown. In FIGS. 8 and 9, the common mode value for voltage Vpllin is 1.5 V. Waveforms 800 and 900 show that voltage Vpllin starts at the common mode voltage of 1.5 V, and, regardless of current Igyro, is settled in the DC constant voltage of the common mode voltage plus or minus the amplitude of 200 mV, after the settling time (e.g., tt02 nA and tt2 μA). For example, in FIG. 8, voltage Vpllin starts at 1.5 V, current Igyro is small (e.g., 0.2 nA) and does not affect voltage Vpllin, which remains at 1.5V. Current Igyro is then changed in accordance with techniques of embodiments of the invention, and voltage Vpllin in response to that change also changes, and eventually settles between 1.3 V and 1.7 V, which is 1.5 V plus or minus the amplitude of 200 mV. In FIG. 9, voltage Vpllin also starts at 1.5 V, but current Igyro at 2 μA is large, causing voltage Vpllin to swing between the plus and minus amplitude of 500 mV. Eventually, however, as current Igyro changes in accordance with techniques of embodiments of the invention, voltage Vpllin responds and eventually settles also at the plus and minus amplitude of 200 mV, or between 1.3 V and 1.7 V as in FIG. 8.

A number of embodiments of the invention have been described. It will nevertheless be understood that various modifications may be made without departing from the spirit and scope of the invention. For example, in the illustrative circuits, when a capacitor is used, a capacitive circuit, component, device or network (e.g., combination of circuit, device, component, etc.) may be used in replace of that capacitor. Some transistors are shown to be of a particular type (e.g., N-type for transistors Nup and Ndn, etc.), but the invention is not limited to such a configuration because selecting a transistor type (e.g., N-type, P-type) is a matter of design choice based on need, convenience, etc. Embodiments of the invention are applicable in variations and/or combinations of transistor types. Additionally, some signals are illustrated with a particular logic level to operate some transistors (e.g., activated high, deactivated low, etc.), but selecting such levels and transistors are also a matter of design choice, and embodiments of the invention are applicable in various design choices.

Each claim of this document constitutes a separate embodiment, and embodiments that combine different claims and/or different embodiments are within scope of the invention and will be apparent to those skilled in the art after reviewing this disclosure. Accordingly, the scope of the invention should be determined with reference to the following claims, along with the full scope of equivalences to which such claims are entitled.

What is claimed is:

1. A circuit comprising:
   a microelectromechanical structure configured to provide a current to a current path;
   an amplifier having a first input coupled to the current path, a second input configured to receive a first voltage, and an output configured to provide a second voltage;
   a first transistor coupled to the first input and the output of the amplifier;
   a second transistor having a gate configured to receive the second voltage and a source coupled to a first capacitive device;
   a first comparator having a first input configured to receive a third voltage at the source of the second transistor, a second input configured to receive a first reference voltage, and an output;
   a second comparator having a first input configured to receive the third voltage, a second input configured to receive a second reference voltage, and an output;
   a third transistor having a gate coupled to the output of the first comparator;
   a fourth transistor having a gate coupled to the output of the second comparator, and a drain coupled to a source of the third transistor and a gate of the first transistor; and
   a second capacitive device having one end coupled to the gate of the first transistor.

2. The circuit of claim 1, further comprising a fifth transistor coupled to the source of the second transistor.

3. The circuit of claim 1, wherein the first transistor is a high-voltage N-channel metal-oxide-semiconductor field-effect transistor.

4. The circuit of claim 1, wherein the microelectromechanical structure is a gyro.

5. The circuit of claim 1, further comprising:
   a driver configured to generate a control voltage for controlling the microelectromechanical structure; and
   a phase-lock loop circuit configured to receive the second voltage and control the driver.

6. A circuit comprising:
   an amplifier having a first input coupled to a current path, a second input configured to receive a first voltage, and an output configured to provide a second voltage;
   a voltage-controlled resistor coupled between the first input and the output of the amplifier, a resistance value of the voltage-controlled resistor is controlled by a control signal;
   a sub-circuit configured to receive the second voltage and generate a third voltage based on the second voltage;
   a first comparator having a first input configured to receive the third voltage, a second input configured to receive a first reference voltage, and an output;
   a second comparator having a first input configured to receive the third voltage, a second input configured to receive a second reference voltage, and an output; and
   a charge pump circuit configured to receive the outputs of the first and second comparators and generate the control signal.

7. The circuit of claim 6, further comprising a microelectromechanical structure configured to provide a current to the current path.

8. The circuit of claim 7, wherein the microelectromechanical structure is a gyro.

9. The circuit of claim 7, further comprising:
   a driver configured to generate a control voltage for controlling the microelectromechanical structure; and
   a phase-lock loop circuit configured to receive the second voltage and control the driver.

10. The circuit of claim 6, wherein the charge pump comprises:
    a first transistor having a gate coupled to the output of the first comparator; and
    a second transistor coupled to the first transistor in a series manner, the second transistor having a gate coupled to the output of the second comparator.

11. The circuit of claim 10, wherein the charge pump further comprises a capacitor having one end coupled to a node between the first and second transistors.

12. The circuit of claim 10, further comprising a capacitor having one end coupled to the first inputs of the first and second comparators.

13. The circuit of claim 6, wherein the voltage-controlled resistor is a high-voltage metal-oxide-semiconductor field-effect transistor.

14. The circuit of claim 13, wherein the high-voltage metal-oxide-semiconductor field-effect transistor is an N-channel transistor.

15. A method comprising:
    converting, by an amplifier and a voltage-controlled resistor, a current signal into a voltage signal having an alternative-current component and a direct-current component;
    determining, by a first comparator and a second comparator, whether the alternative-current component of the voltage signal has an amplitude beyond a predetermined voltage range;
    generating, by a charge pump, a control signal based on the determination of whether the amplitude is beyond the predetermined voltage range; and
    controlling the voltage-controlled resistor according to the control signal.

16. The method of claim 15, wherein the determination of whether the amplitude is beyond the predetermined voltage range comprises:
    comparing, by the first comparator, voltage levels of the voltage signal with a predetermined high threshold voltage; and
    comparing, by the second comparator, voltage levels of the voltage signal with a predetermined low threshold voltage.

17. The method of claim 15, wherein the generation of the control signal comprises:
    increasing a voltage level of the control signal after a determination that a voltage level of the voltage signal is higher than a voltage level of a predetermined high threshold voltage; and
    decreasing the voltage level of the control signal after a determination the voltage level of the voltage signal is lower than a voltage level of a predetermined low threshold voltage.

18. The method of claim 15, wherein the voltage-controlled resistor is a high-voltage metal-oxide-semiconductor field-effect transistor.

19. The method of claim 18, wherein the high-voltage metal-oxide-semiconductor field-effect transistor is an N-channel transistor.

20. The method of claim 15, wherein the control of the voltage-controlled resistor comprises:
    increasing a resistance value of the voltage-controlled resistor responsive to decrease of a voltage level of the control signal; and
    decreasing the resistance value of the voltage-controlled resistor responsive to increase of the voltage level of the control signal.

* * * * *